(12) United States Patent
Bayer et al.

(10) Patent No.: US 11,266,959 B2
(45) Date of Patent: Mar. 8, 2022

(54) LOW PRESSURE FLUCTUATION APPARATUSES FOR BLENDING FLUIDS, AND METHODS OF USING THE SAME

(71) Applicant: Versum Materials US, LLC, Tempe, AZ (US)

(72) Inventors: Benjamin Patrick Bayer, Albuquerque, NM (US); Laura Suk Chong Chan, San Bruno, CA (US); Fady Khalil Ereifej, Albuquerque, NM (US); Daniel Valentin Roybal, Rio Rancho, NM (US)

(73) Assignee: Versum Materials US, LLC, Allentown, PA (US)

( * ) Notice: Subject to any disclaimer, the term of this patent is extended or adjusted under 35 U.S.C. 154(b) by 924 days.

(21) Appl. No.: 15/518,177

(22) PCT Filed: Oct. 8, 2015

(86) PCT No.: PCT/US2015/054698
§ 371 (c)(1),
(2) Date: Apr. 10, 2017

(87) PCT Pub. No.: WO2016/057797
PCT Pub. Date: Apr. 14, 2016

(65) Prior Publication Data
US 2017/0259226 A1 Sep. 14, 2017

Related U.S. Application Data

(60) Provisional application No. 62/061,538, filed on Oct. 8, 2014.

(51) Int. Cl.
*B01F 5/10* (2006.01)
*G05D 7/06* (2006.01)
(Continued)

(52) U.S. Cl.
CPC .......... *B01F 5/106* (2013.01); *B01F 3/04985* (2013.01); *B01F 3/088* (2013.01);
(Continued)

(58) Field of Classification Search
CPC .... B01F 5/106; B01F 3/04985; B01F 3/0861; B01F 3/088; B01F 15/00149;
(Continued)

(56) References Cited

U.S. PATENT DOCUMENTS

| 5,924,794 A | 7/1999 | O'Dougherty et al. |
| 6,572,255 B2 * | 6/2003 | Husher .................. B01F 3/088 366/132 |

(Continued)

FOREIGN PATENT DOCUMENTS

WO 03071369 A1 8/2003

OTHER PUBLICATIONS

European International Search Report and Written Opinion of the International Searching Authority, dated Jan. 27, 2016, for PCT/US2015/054698.

*Primary Examiner* — Charles Cooley
(74) *Attorney, Agent, or Firm* — Daniel A. DeMarah, Jr.

(57) ABSTRACT

A low pressure fluctuation control apparatus comprises a liquid recirculation loop comprising a dip tube, a diaphragm or bellows type pump, a first regulator, a first flow meter, a junction, and a return tube. A back pressure controller is located in the return tube. In addition, the apparatus comprises a material supply line fluidly connected the liquid recirculation loop via the junction. A flow control system is located in the material supply line. The recirculation loop draws liquid from a supply container by the dip tube, and returns a portion of the liquid to the supply container by the (Continued)

return tube. The backpressure flow controller regulates the flow rate of the liquid, thereby steadying fluctuations in the liquid being supplied.

41 Claims, 3 Drawing Sheets

(51) Int. Cl.
   *G05D 11/13* (2006.01)
   *B01F 3/04* (2006.01)
   *B01F 3/08* (2006.01)
   *B01F 15/00* (2006.01)
   *G01F 1/34* (2006.01)

(52) U.S. Cl.
   CPC ...... *B01F 3/0861* (2013.01); *B01F 15/00149* (2013.01); *B01F 15/00357* (2013.01); *B01F 15/00974* (2013.01); *G01F 1/34* (2013.01); *G05D 7/0635* (2013.01); *G05D 7/0647* (2013.01); *G05D 7/0688* (2013.01); *G05D 11/132* (2013.01); *B01F 2215/0096* (2013.01)

(58) Field of Classification Search
   CPC .......... B01F 15/00357; B01F 15/00974; B01F 2215/0096; G05D 7/0635; G05D 11/132; G05D 7/0647; G05D 7/0688; G01F 1/34
   See application file for complete search history.

(56) References Cited

U.S. PATENT DOCUMENTS

| | | | |
|---|---|---|---|
| 6,994,464 B2* | 2/2006 | Villwock | B01D 19/0052 366/136 |
| 7,905,653 B2* | 3/2011 | Wilmer | B01F 5/061 366/132 |
| 9,770,804 B2* | 9/2017 | Byers | B24B 57/02 |
| 10,562,151 B2* | 2/2020 | Byers | B24B 57/02 |
| 2002/0034122 A1 | 3/2002 | Lemke | |
| 2002/0048213 A1 | 4/2002 | Wilmer et al. | |
| 2002/0085447 A1 | 7/2002 | Snyder et al. | |
| 2003/0031086 A1 | 2/2003 | Shikami et al. | |
| 2004/0071555 A1 | 4/2004 | Chen et al. | |
| 2010/0224256 A1* | 9/2010 | Tseng | B24B 37/04 137/2 |
| 2014/0261824 A1* | 9/2014 | Byers | B24B 57/02 137/896 |
| 2017/0076825 A1* | 3/2017 | Lacalle Bayo | B01F 1/0011 |
| 2017/0259226 A1* | 9/2017 | Bayer | B01F 15/00974 |
| 2018/0021921 A1* | 1/2018 | Byers | B24B 57/02 137/896 |

* cited by examiner

LOW PRESSURE FLUCTUATION APPARATUSES FOR BLENDING FLUIDS, AND METHODS OF USING THE SAME

This application claims the benefit of priority under 35 U.S.C. § 119(e) to earlier filed U.S. patent application Ser. No. 62/061,538, filed on 8 Oct. 2014, having the title "Slurry Supply Apparatus and Method", which is entirely incorporated herein by reference.

BACKGROUND OF THE INVENTION

There are several blending techniques commonly employed to blend ingredients for use in a semiconductor fabrication facility. Ingredients may include one or more of the following: liquids such as water, CMP slurry (abrasives and water or other diluent), hydrogen peroxide, acids, bases and other chemicals. The common blending methods include scale blending, which uses a scale having load cells to weigh ingredients in a mix tank. Another common method is beaker blending, which uses volumetric vessels to measure ingredients, that are then transferred from the volumetric vessels to a mix tank. A final common method is flow controller blending, which uses flow controllers to measure ingredients.

There are many types of flow controllers on the market. The term "flow controller" as it is employed in this document means the type that controls the control valve based on feedback from the flow meter, creating a closed-loop control system, with a response time to setpoint changes of less than 3 seconds.

The advantage of scale blending and beaker blending is they can employ pumps to transfer ingredients directly from slurry supply containers to the mix tank (to be weighed) or to the volumetric vessels. In contrast, reliable flow controller blending has, prior to this invention, required two pumps and a tank to accomplish a similar task. One disadvantage of scale and beaker techniques is the requirement for a mix tank. Another disadvantage is the delay that occurs in the process during mixing in the mix tank.

The advantage of flow controller blending is immediate availability of the blend. Scale and beaker blending requires a delay for mixing in a mix tank. Flow controller blending does not require a delay or a mix tank. An advantage of scale or beaker blending techniques is they are capable of blending accurately even when ingredient supply pumps cause significant pressure variation. In contrast, flow controller blending is sensitive to pressure variation. High supply pressure variation can cause the flow controller to over-adjust. Over-adjustment is defined as making rapid adjustments in response to short-duration, rapidly changing signals, which results in amplification of process variation rather than reduction.

Pressure variation is typically defined as the coefficient of variation, CV of pressure (PSIG). CV is calculated from 600 data points, 1 data point collected per second, per the equation below:

$CV(\pm\%)=\sigma/\mu$ Where $\sigma$ is defined as the standard deviation ($1\sigma$) of liquid pressure (PSIG) and $\mu$ is defined as the mean of liquid pressure (PSIG).

One solution to the flow controller sensitivity problem is to use an apparatus that supplies the flow controllers via a low pressure variation pump, such as a bearingless magnetically levitated ("maglev") pump. Maglev pumps must be gravity primed. Gravity priming in turn requires a slurry supply container having a cone-bottom tank and physically locating the pump below the level of the cone's bottom. This apparatus permits low pressure variation delivery to the flow controller. Bearingless magnetically levitated centrifugal pumps have no suction lift capability. So to transfer ingredients into the tank requires another pump with suction lift capability. The end result is that flow controller blending is more expensive than scale or beaker blending because of the additional tank and maglev pump required to reduce pressure variation.

The apparatus of the present invention does not require the maglev pump or gravity-prime tank.

Related references include: U.S. Pat. Nos. 6,168,048, 5,573,385, 6,364,640, 6,095,194, 7,108,241, 5,983,926, 5,983,926, 6,889,706, 8,155,896, 7,885,773, 7,447,600, 7,650,903, and 7,292,945, all of which are incorporated herein by reference.

There is still a need for an apparatus and method that provides consistent flow from a pump to a flow controller that is compact, of reduced complexity, eliminates costly parts, like pressure vessels, and uses reliable equipment and methods to provide low pressure fluctuation in a liquid stream that can be used for a variety of fluids, including slurries.

BRIEF SUMMARY OF THE INVENTION

The invention provides an improved apparatus and method to supply a (volumetric liquid) flow controller with low pressure fluctuation. The invention comprises a pump and a flow controller. The pump has closed-loop flow rate control. The pump flow rate control helps eliminate pressure fluctuation. The pump may be a low pressure fluctuation pump and/or a pump in series with a pressure regulator. The pump flow capacity may be in a certain ratio with the pressure regulator for pressure fluctuation to be reduced effectively.

The apparatus of the invention is one aspect of the invention. Another aspect is the process of the invention which permits low pressure variation. By carefully adjusting the process, the apparatus provides low pressure variation. Conversely, without the apparatus adjustable characteristics, the process would not provide low pressure variation. To summarize, the invention is an adjustable apparatus and process of operating the apparatus to achieve low pressure variation and thereby low variation in the flow of the raw slurry to be blended or other liquids that may be blended or consumed downstream of the apparatus of this invention.

The term "flow controller" refers to a device having a flow meter, a control valve, and a controller and is used to also include a volumetric liquid flow controller having a flow meter, and controller and a regulator-and-control-valve-in-one. The term regulator-and-control-valve-in-one refers to the unique property used in some embodiments of the invention that provides a flow controller, containing a regulator, a flow meter and a controller, such that the regulator function which provides pressure fluctuation suppression and the control valve function which provides flow rate adjustment are both implemented at the same time by the same device. The regulator-and-control-valve-in-one is further improved in some embodiments of the invention by placing the regulator-and-control-valve-in-one in an upstream position relative to a flow meter so the flow meter can measure the pressure suppression effect of the regulator-and-control-valve-in-one. The regulator-and-control-valve-in-one is further improved in some embodiments of the invention by a controller that permits the user to define operating pressure ranges whereby the regulator-and-control-valve-in-one is optimally effective suppressing pressure fluctuation and controlling flow rate. The term "controlled regulator" may be used interchangeably with the term "regulator-and-control-valve-in-one". Additionally the use of the term "regulator" includes the controlled regulator and a regulator without a controller. The invention operates a regulator in a certain pilot pressure (for gas, air) range which provides pressure fluctuation suppression while controlling flow effectively. This innovation eliminates the need for separate regulator and control valve.

The invention provides one or more of the following advantages. The invention does not contain a pressure vessel, making it suitable for settling CMP slurries. The invention does not employ a pulse dampener, which have reliability drawbacks. In some embodiments, the low pressure fluctuation pump may not operate, as in the prior art with one chamber working and one chamber pulse suppressing, thereby increasing the pump reliability. Instead, the pump, useful in this invention, may have two working diaphragms. The pressure regulator may have two diaphragms and be free of a travel stop. In some embodiments, the pressure regulator has first and second, often upper and lower diaphragms, where the first diaphragm (typically the lower diaphragm) senses the inlet pressure. This invention may be free of wave-dissipating projections in the wall leading into the regulator. In some embodiments, those projections would promote agglomeration, for example in a CMP liquid. As stated above the regulator in the present invention may eliminate the need for a separate control valve. Additionally, therefore, the controller in the present invention can feedback to the regulator and not the control valve.

In one embodiment of the invention, the pressure regulator of the invention is a standard, proven design with two diaphragms connected by a shaft having a closure member, the shaft running through the valve orifice. The inlet pressure is sensed by the lower diaphragm in contact with the inlet fluid. There is no travel stop restricting pulsation dampening effectiveness of the regulator; it is travel stop free. There are no wave-dissipating projections which promote CMP liquid agglomeration. The control valve of the invention is the same pressure regulator, rather than a separate device. This is space efficient and cost effective.

The regulators comprising two diaphragms may be spring-loaded (direct operated), pneumatic (dome-loaded) or weight-loaded, linear-actuated, motor-loaded, or the like.

The invention discloses recommended operating parameters the inventors discovered. The invention discloses pilot pressure ranges for dome loaded pressure regulators which produce effective suppression of pressure fluctuation. The invention also discloses the benefit, in some embodiments, of oversizing the regulators from a flow capacity standpoint to operate the regulator at relatively low pilot pressure, which suppresses pressure fluctuation effectively, while still providing sufficient flow downstream.

In this invention, the flow meter may be located directly downstream of the regulator (and control valve in one). The downstream flow meter location may be beneficial to the multi-stage pressure fluctuation suppression of the invention. The upstream regulator can serve as a control valve and as a pressure fluctuation suppression device. The flow meter downstream is thereby protected from pressure fluctuation by the regulator. The flow meter provides backpressure to the regulator, improving its effectiveness. Since the regulator may be a fail-closed, bubble-tight device, an isolation valve upstream of the flow meter is not necessary, with the invention. In this way, in addition to serving as a pressure fluctuation suppressor and a control valve, it may additionally serve as an isolation valve.

One type of regulator useful in this invention is a dome loaded pressure regulator. Despite being entirely mechanical, these devices are sophisticated, being capable to sense differences between inlet and outlet pressure using two diaphragms, one in contact with the inlet, the other in contact with the outlet. When the diaphragms sense a pressure change, the shaft containing the closure member, attached to both diaphragms, running through the orifice, changes position, such that the pressure fluctuation is eliminated. For example, if inlet pressure increases, the shaft presses down on the inlet diaphragm, causing the closure member to shift, opening the orifice, which relieves the pressure. Regulators operate on the energy of the process. The mechanical operating principle of regulators presents an advantageously quick, direct, consistent and reliable response to pressure fluctuations.

The present invention relates to a pump-driven system which supplies a volumetric liquid flow controller, where the feed-in to the volumetric liquid flow controller has as little pressure fluctuation as possible, where the flow controller is part of a closed-loop flow control system, where the pump is capable of using suction to remove liquid from a vessel, and the materials of construction of the wetted parts of the apparatus are high purity chemical resistant materials, such as PFA or PTFE.

The inventors have designed apparatuses for flow controlling liquids and blending components and in some embodiments blending those liquids and a process for operating the apparatuses. These apparatatuses are suitable for use in semiconductor fabrication processes. The apparatus of the invention comprises a pump which uses suction to withdraw liquid from a vessel, circulate this liquid in a loop, and a flow controller that draws liquid from this loop, the flow controller being highly sensitive and accurate, notwithstanding the type of pump upstream. In another aspect of the invention, the invention provides, an apparatus of the invention comprising a flow controller that controls the flow rate for raw slurry that is fed to the raw slurry supply pipe that is blended with at least one other slurry component transported in at least one other slurry component supply pipe, each slurry component being transported in its own slurry component supply pipe, said slurry supply pipe connected to a recirculation loop said recirculation loop comprising a dip tube for insertion into a slurry supply container, a pump, and liquid backpressure control device. The rate for raw slurry that is fed to the raw slurry supply pipe that is blended with at least one other slurry component transported in at least one other slurry component supply pipe, each slurry component transported in its own slurry component supply pipe, said slurry supply pipe connected to a recirculation loop said recirculation loop comprising a dip tube for insertion into a slurry supply container, a pump, and liquid backpressure control device. The apparatus is such that a variety of characteristics can be adjusted, such as: Liquid (e.g. raw slurry) pressure in the recirculation loop, pump venturi pressure, pump diaphragm or bellow gas and vacuum flow, pump speed, pump diaphragm (or bellows) overlap, pump gas backpressure, and flow controller setpoint, which is the amount of raw slurry or other liquid desired to be blended to make a blended slurry or other liquid. Instead of using two pumps, one with suction lift capability, and one with minimal pressure variation or fluctuation (either of those terms can be used herein and can be substituted for each other), a single pump with both suction lift capability and pressure variation or fluctuation is used. By this invention the pressure variation or fluctuation caused by the pulsing or reciprocating pump (that provides suction lift) in the lines is controlled so that the pressure variation's or fluctuation's effect on the apparatus is minimized and the flow controller performance is optimal and in some embodiments, a consistently blended slurry can be achieved. Pump pressure variation or fluctuation is reduced by using the apparatus and process of the invention, which prevents flow controller over-adjustment. The invention permits direct feeding of flow controllers using a pulsing pump from slurry or other liquid supply containers. The end result of this invention is a mechanically simpler, more direct, and less expensive method of blending compared to prior art.

In another aspect of the invention is provided an apparatus or process of providing low pressure fluctuation flow control of liquid (and optionally subsequent blending slurry), comprising: recirculation loop for recirculating raw slurry or other liquid; slurry or other liquid material supply line in fluid communication with the recirculation loop, said slurry or other liquid material supply line having a first flow controller; the first flow controller being closed-loop control type; wherein said recirculation loop comprises a back pressure controller, pump having suction lift capacity, wherein the pump provides means for adjusting its speed and means for adjusting one or more or all of the following: chamber overlap, gas backpressure, venturi pressure and gas and vacuum flow to the one or more diaphragms or bellows; where the process of operating the apparatus comprises directing 20% or less of the slurry or other liquid in the recirculation loop to the slurry material supply line, or in other embodiments to the flow control system. In some embodiments, the apparatus and method comprise second flow controller for a slurry component to be mixed with the raw slurry to make a slurry blend; the second flow controller being closed-loop control type; and a junction or manifold where the raw slurry and the one or more other slurry components form a blended slurry.

In another aspect of the invention alone or with other aspects, the process may additionally comprise operating the apparatus having a gas backpressure in the pump that is equal to or greater than the slurry or other liquid pressure in the recirculation loop when the slurry or other liquid supply pressure is measured in the recirculation loop between the pump and the junction with the slurry or other liquid material supply line.

In another aspect of the invention alone or with other aspects, the process of operating the apparatus comprises adjusting the gas backpressure and the venturi pressure in the pump to be equal +/−10%.

In another aspect of the invention alone or with other aspects the apparatus or process of blending slurry or liquid, comprises: recirculation loop for recirculating a raw slurry or other liquid; a slurry or liquid material supply line in fluid communication with the recirculation loop, said slurry or liquid material supply line having a first flow controller; the first flow controller being closed-loop control type; second flow controller for a slurry component to be mixed with the raw slurry to make a slurry blend; the second flow controller being closed-loop control type; mixing junction or manifold where the raw slurry and the one or more other slurry components form a blended slurry; wherein said recirculation loop comprises a back pressure controller, pump having suction lift capacity, wherein the pump provides means for adjusting its speed and means for adjusting one or more or all of the following: chamber overlap, gas backpressure, venturi pressure and gas and vacuum flow to the one or more diaphragms or bellows; where the process of operating the apparatus comprises having a gas backpressure in the pump that is equal to or greater than the liquid pressure in the recirculation loop when the liquid supply pressure is measured in the recirculation loop between the pump and the junction with the liquid material line.

In another aspect of the invention alone or with other aspects is an apparatus and process of blending liquid, comprising: recirculation loop for recirculating a liquid; a liquid material supply line in fluid communication with the recirculation loop, said liquid material supply line having a first flow controller; the first flow controller being closed-loop control type; second flow controller for a slurry component to be mixed with the raw slurry to make a slurry blend; the second flow controller being closed-loop control type; junction or manifold where the raw slurry and the one or more other slurry components form a blended slurry; wherein said recirculation loop comprises a back pressure controller, pump having suction lift capacity, wherein the pump provides means for adjusting its speed and means for adjusting one or more or all of the following: chamber overlap, gas backpressure, venturi pressure and gas and vacuum flow to the one or more diaphragms or bellows; wherein the process of operating the apparatus, adjusting the gas backpressure and the venturi pressure in the pump to be equal +/−10%.

Any of the above described apparatuses or processes wherein the backpressure controller (or means to adjust the backpressure) in the recirculation loop is manually, electronically or pneumatically adjustable.

Any of the above described apparatuses or processes wherein said first flow controller for the liquid is set at 1-20 or 2-8 or 1-3 liters per minute (LPM).

Another aspect of the invention provides an apparatus and process of blending a liquids, where the apparatus and process comprises alone or with other aspects: recirculation loop for recirculating a first liquid; a first liquid material supply line in fluid communication with the recirculation loop, said first liquid material line having a first flow controller; the first flow controller being closed-loop control type; optional second flow controller for a second liquid component to be mixed with the first liquid to make a liquid blend; the optional second flow controller being closed-loop control type; junction or manifold where the first liquid and the one or more other liquid components form a blend liquid; wherein said recirculation loop comprises a back pressure controller, pump having suction lift capacity, wherein the pump provides means for adjusting its speed, chamber overlap, gas backpressure, venturi pressure and gas and vacuum flow to the one or more diaphragms or bellows.

In another aspect of the invention, the apparatus or method comprises additional component streams and additional component supply lines that are flow controlled to form the flow controlled liquid. The apparatus may comprise additional flow controllers and/or manifolds for supplying and blending those components to constitute a mixture.

Based on the description herein there are commercially available pumps, control valves, filter housings, check valves, control devices, instruments, liquid supply containers, backpressure controllers and mixers that may be selected so that the apparatus will function and such that the blend will be in accordance with this invention and accurate, repeatable, high purity, and not contaminated with corrosion products.

Corrosion resistance commonly requires the use of corrosion resistant plastics as materials of construction. Some corrosion resistant plastics include polyethylene, polypropylene, perfluoroalkoxy, polytetrafluoroethylene, and polyvinylchloride. Devices may be constructed of one or more of these materials, and other specialized corrosion resistant materials. There are many vendors of these devices available. Some vendors of suitable pumps include Yamada, Ingersoll-Rand, Nippon Pillar, Wilden, and Trebor. Some vendors of suitable valves include Entegris, SMC, Swagelok, Gemu, and Mega Flow Corporation. Some vendors of suitable control devices include Rockwell Automation, SMC, Trebor, and Entegris. Some vendors of suitable filter housings include Pall and Entegris. Some vendors of suitable check valves include Entegris, SMC and Parker. Some vendors of suitable instruments include Levitronix, Entegris, SMC, TEM-TECH and Gemu. Some vendors of liquid supply containers include Entegris and Schutz. Some vendors of back pressure controllers used to adjust the backpressure in the recirculation include Gemu, Futurestar, Entegris, and SMC. Some vendors of mixers include Edlon and SMC.

In one embodiment, the apparatus of the invention comprises a dip tube for inserting into a slurry or liquid supply container, that is in fluid communication with a recirculation loop. The recirculation loop further comprises in fluid communication therewith a pump, and a tee or other junction for connection to a raw slurry or liquid supply line in fluid communication with the recirculation loop. The liquid supply line either supplies optional mixing or blending equipment that may be part of the apparatus of this invention or supplies a tool or other downstream use for the liquid (that is not part of this apparatus). The slurry or liquid supply container contains a raw CMP slurry or other liquid. (The raw CMP slurry means that the raw slurry must be diluted with water or diluents and/or combined with chemical components prior to use.) The connection between the slurry or liquid supply container, pump, flow controller, and all other components (parts, not chemical components) of the recirculation loop may be (is preferably) via tubing that connects these components (parts) so that fluid can pass freely from the fluid outlet port of the upstream component to the fluid inlet port of the downstream component. (Tubing can be replaced by piping or the like.)

The pump is connected to a pump control device via two gas ports. The term "gas" is used to collectively refer to compressed clean dry air (CDA), nitrogen, and/or other inert gas, typically CDA. The connection between the pump, pump control device and source of gas is understood to mean tubing connects the gas to the pump and is separate from the tubing of the recirculation loop connecting the liquid supply container, pump and flow controller. High purity and chemically resistant fluid connections may be formed by using perfluoroalkoxy (PFA) tubing and PFA fittings which fit the Flare or Female National Pipe Taper (FNPT) ports on the pump, liquid supply container, flow controllers and other components. Gas connections may be formed by using polyethylene or nylon tubing and polypropylene fittings which fit the FNPT or one-touch ports on the pump gas inlets, solenoids, and source of the gas. The pump control device attached to the gas supply turns solenoid valves on or off to separately supply two chambers of the pump. The on and off times of each solenoid is controlled by a control program loaded in the pump control device. The solenoid valves are connected to a tee, which in turn is connected to a source of gas. The pump control device is connected to a higher-level control device which operates the pump control device on demand.

Returning to the recirculation loop, at the tee or other junction (referred to as the tee, although it is understood the junction can be any shape connector between the recirculation loop and the liquid supply line): One side of the tee is fluidly connected directly or indirectly to the pump, a second side of the tee is connected to a line that connects ultimately to the return inlet of the liquid supply container (and is part of the recirculation loop), and the third side of the tee supplies liquid to a flow control device (flow controller), via a liquid supply line (also referred to herein as a liquid material supply line). The liquid-return side of the tee is connected to and/or in fluid communication with a variable area flow meter ("rotameter") with a needle valve, (which acts as a back pressure controller and in alternative embodiments may be a different type of back pressure controller, others are described below). The needle valve is a means to adjust backpressure in the recirculation loop. The needle valve is connected to or in fluid communication with the liquid supply container which preferably has a second, shorter diptube inserted in it for the return of liquid from the recirculation loop. The third side of the tee is connected to a flow meter (part of the flow controller). The flow meter is electronically connected to a control device or circuit, which receives setpoint signals, calculates differences between the setpoint and the actual flow, and produces an adjustment signal. The adjustment signal is sent to a control valve. A control valve is defined as a valve capable of partially or fully opening or closing in response to a pneumatic or electronic signal. The setpoint is supplied by a higher-level control device or otherwise inputted into the controller. The flow meter is connected to an electronically operated control valve. The control valve opens and closes in response to the adjustment signal provided by the control device. The flow meter and control valve are also referred to as a flow controller. The flow meter may be downstream of the control valve or the control valve may be downstream of the flow meter. Downstream of the control valve or the flow meter is a fluidly connected check valve. In some embodiments, the check valve is connected to a second tee (it is understood it can be a junction of any shape) in the line.

(Note any use of "connected to" to describe any and all aspects and parts of the invention maybe replaced with the terms "fluidly connected to" and/or "in fluid communication therewith". Further, it is understood that the term connected to means that the components of the apparatus may be directly or indirectly connected to each other with one or more sections of tubing and/or other piping and/or connections and/or other parts or components connected between. Any where a connection is described "directly or indirectly connected to" or the like may be added herein.

In certain embodiments, one side of the just-mentioned second tee is connected to the outlet of the control valve or the flow meter. The second side of the second tee is connected to an optional mixing device which is connected to a reservoir or point of use for the blended liquid. The third side of the second tee is connected to a check valve, optional flow controller, and source of a second liquid component which is referred to as chemical component, e.g. water, oxidizing agent, etc. The optional mixing device or mixer mixes the two ingredients so they are fully mixed. The mixer is connected to a reservoir or point of use which stores or uses the blended liquid product.

In certain embodiments, the source of the second chemical component (also referred to as, ingredient) may be supplied by an external system. The second ingredient source may be connected to a second flow controller. The flow controller, if present, may comprise a flow meter and a control valve. Both the control valve and the flow meter are connected to a control device which may operate like the first flow controller, described above. Downstream of the control valve or in some embodiments, the flow meter, is a second check valve. The second check valve is connected to the second tee.

In alternative embodiments, two low pressure fluctuation flow control apparatuses of this invention can be used together. For example the second flow controller of the embodiment described above may be part of a flow control system (downstream of the recirculation loop) of a separate low pressure fluctuation flow control apparatus as described herein.

The preceding paragraphs have described embodiments of the apparatuses of the invention. In alternative embodiments, the apparatus may comprise one or more of the following alone or in any combination: additional mixing devices, flow controllers, filter housings, electronic or pneumatic control valves to adjust backpressure in the loop, a pump containing a shuttle, a pump without a controller, flow meters, pressure transducers, pulse dampeners, shock blockers, flow switches, pneumatic valves, manual valves, and Y-strainers. These elements may be added singly, or multiply, at various points in the recirculation loop or else where in the piping or tubing of the apparatus.

The process of the invention may be used to overcome problems with prior art apparatuses including: difficulties removing gas from the system during startup if the apparatus comprises a filter housing in the recirculation line; difficulty of simultaneously obtaining high flow, pressure and low pressure fluctuation; and the difficulty of maintaining low pressure fluctuation when the flow controller draws off liquid from the recirculation loop. CMP liquid requires a minimum flow of 1-2.5 ft/s, depending on the abrasive, to prevent sedimentation of the abrasive. Typically in ½" tubing, approximately 3.3 LPM is required to maintain a minimum 2.5 ft/s velocity. The process of the invention seeks to provide about 3.3 LPM flow to the flow controller to prevent sedimentation. Some flow controllers require 12 PSIG or less to operate, depending on the flow controller model and brand. The process of the invention seeks to provide at least 12 PSIG liquid pressure to the flow controller to ensure flow controller operation is unimpaired. Directing flow of the liquid from the recircuation loop to the flow controller for blending provides an additional challenge. The flows and pressures in the recirculation loop must meet minimum requirements previously described. When liquid is diverted to the flow controller the pressure in the recirculation loop decreases, thereby increasing pressure fluctuation in the loop. The process of this invention provides an apparatus and a method that provides for reasonable pressures and flows to be maintained in the recirculation loop.

Complicating the solution to the problems described is the fact that the factors flow, pressure, and pressure fluctuation interact significantly. Backpressure and flow interact negatively. This means high backpressure causes low flow. Initially, the backpressure-flow interaction causes flow to be adequate only when backpressure was inadequate, and vice versa. A solution to this interaction was required to make the apparatus work properly for the CMP slurry or liquid blending application. This led to optimization experiments which discovered settings which overcame the problem, reduced the flow-backpressure interaction, and allowed flow and backpressure to be adequate at the same time. In the preferred embodiment, at least some portion of the liquid is flowing through all parts of the recirculation loop continuously when the pump is operating, and the other portion (the balance) of the liquid flows to the flow controller.

DETAILED DESCRIPTION OF THE INVENTION

This invention, apparatus and method, were designed for providing a controlled flow for the purposes of blending a raw CMP slurry with other chemical components to make blended slurry. It is recognized that it may be used for any liquid. It is further recognized that multiply apparatuses can be used together to feed different liquids to a single blending apparatus. It is further recognized that the apparatus and method of this invention may be used to directly provide, for example any tool (not just a blending apparatus) or use that requires a well-controlled flow of a liquid. Therefore, it is understood that any use of term "slurry", "raw slurry" or "CMP slurry" herein may be replaced with "liquid", and the use of "liquid" may be replaced with "slurry", "raw slurry" or "CMP slurry" unless the context requires differently. Further the apparatus of the invention may be described as having blending equipment attached thereto. It is understood that any tool or downstream use could be substituted for the mixing or blending equipment described or shown herein.

The liquid wetted parts of or used in this invention are made of chemical resistant, high purity materials such as ployfluoroalkoxy (PFA) or polytetrafluoroethylene (PTFE), or similar types of materials unless otherwise noted. The device liquid port connection to the tube is made with fittings such as Flare, Primelock, NPTF, NPTM or other fittings, made of chemical resistant, high purity materials such as PFA or PTFE, unless otherwise noted. Some devices also have air ports. The air port fittings and tubes may be made of non-PFA, non-PTFE materials.

The use of the term "flow meter" herein includes flow meters that measure a flow rate measurement and display that measurement via a gauge, dial or electronic display, etc. and flow transmitters which can be used to electronically communicate flow rate measurements to controllers.

The use of the term "electrically connected" includes any form of signal communication, which can be by hard-wires, or radio or electrical waves.

Figure 1:
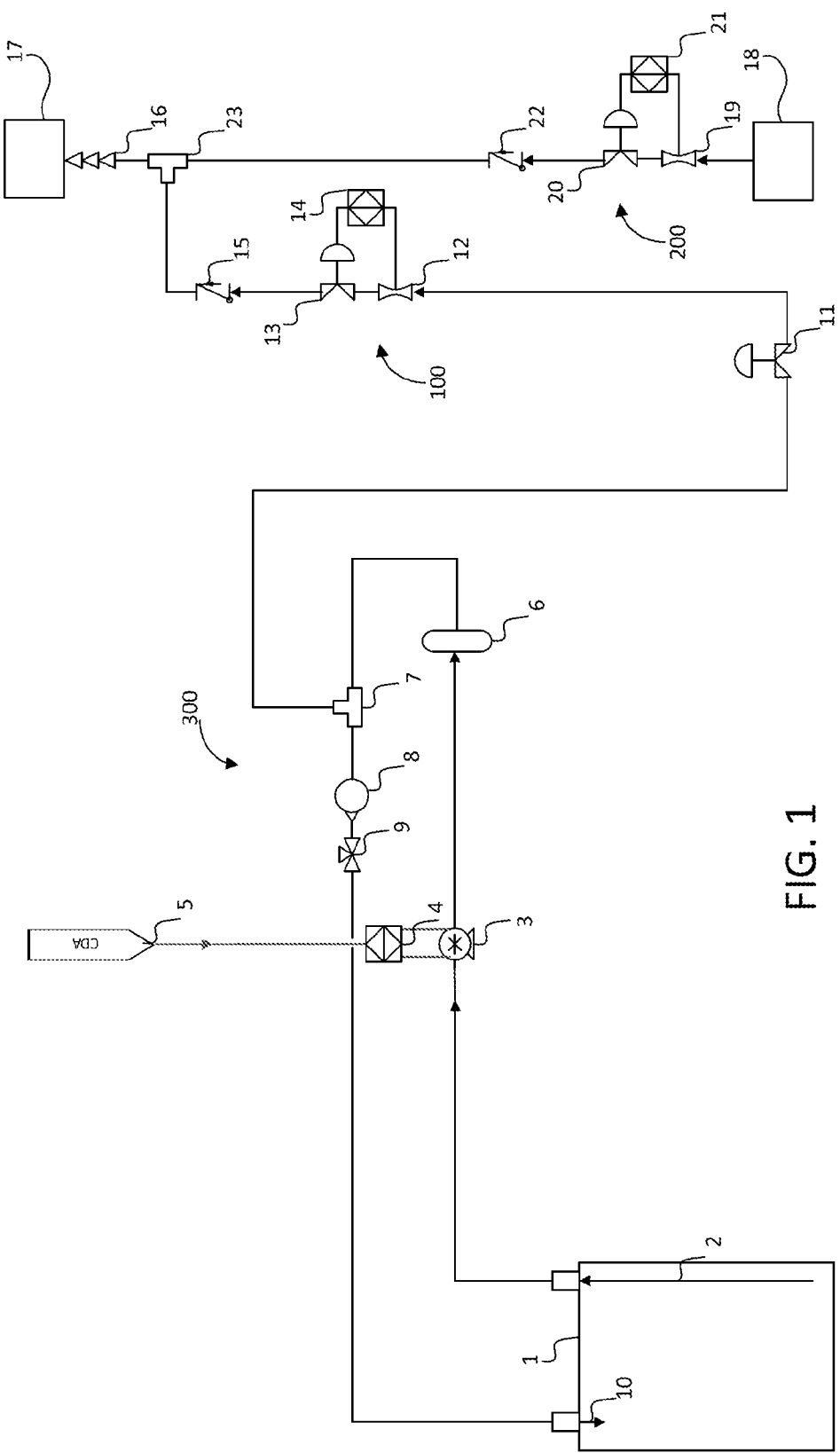
FIG. 1 is one embodiment of an apparatus of this invention.

FIG. 1 shows an apparatus of this invention that comprises a recirculation loop 300 which comprises the following components: liquid supply container 1, suction diptube 2, liquid transfer pump 3, pump controller 4, source of gas 5, filter housing 6, junction or tee 7, variable area flow meter 8 with needle valve 9, and return diptube 10. The recirculation loop supplies liquid from the recirculation loop to a flow controller 100 that is in fluid communication with the recirculation loop. If the liquid is a raw slurry it may be combined with another slurry component stream to form a blended slurry.

In FIG. 1 the apparatus of this invention comprises at least one liquid transfer pump 3 for removing liquid from a liquid supply container 1. Liquid is typically supplied in liquid supply containers of 55 gallons or totes of 300 gallons.

Typically the liquid supply containers have openings only on the top, thereby typically requiring a diptube 2 which is inserted into the liquid supply container and provides suction when the pump is operating. The diptube 2 is typically long enough so that the tip is close to the bottom of the liquid supply container so that most of the liquid in the liquid supply container can be removed. Also required is a pump with suction lift capability, so the pump can lift the liquid out of the container. The pump must also provide flow rate sufficient to supply the flow controller. Operating the pump in the apparatus must produce low pressure fluctuation at the flow controller 100 inlet. Pump inlet ports may be Flare, FNPT or flanged. The pump inlet port size may be ¼", ⅜", ½", ¾" or 1". The pump outlet port may be the same size as the pump inlet port or be a different size. The preferred embodiment pump port size is ½" inlet, ½" outlet, with Flare fittings. The pump may be a Trebor Purus CP.

The pump 3 is defined as a type with suction lift capability, typically bellows pump or diaphragm pump having one or more diaphragms or bellows, in some embodiments dual diaphragms or bellows. The maximum flow of pump 3 may match the maximum flow of the flow controller 100, or, the pump 3 may supply between from 1 to 3 times the maximum flow of the flow controller 100, or the pump 3 may supply between from 1 to 5 times the maximum flow of the flow controller 100. The pump 3 may be selected so that when it is pumping it supplies 50 LPM maximum flow, or 25 LPM maximum flow, or 6 LPM maximum flow. The flow controller 100 may be selected to control the flow from 0-20 LPM, or 0-10 LPM, or 0-5 LPM, or 0-2.5 LPM, or 0-1.25 LPM.

The pump 3 of this embodiment may be a low pressure fluctuation pump. The low pressure fluctuation is of a kind that is produced by a pump with two independent diaphragm chambers, a first chamber and a second chamber, which operate in five steps. In each step, the pump is discharging a nearly constant flow of liquid. In the first step, the first chamber is under pressure (discharging) while the second chamber is under vacuum (suction). In the second step, the first and second chambers are under pressure (discharging, cross-phase). In this step, the term cross-phase refers to the capability of this pump to combine the discharge from two chambers in a balance that prevents the reciprocating pump change-over pressure drop noted in prior art. In the second step, the first chamber pressure falls while in parallel the second chamber pressure rises. In the third step, the first chamber is under vacuum (suction) while the second chamber is under pressure (discharging). In step 4, the first and second chambers are under pressure (discharging, cross-phase). In step 4, the first chamber pressure is rising while in parallel, the second chamber pressure is falling. Step 5 repeats step 1 to start a new 5-step cycle that repeats over and over. As the cycle progresses, each chamber alternates being under pressure, then under vacuum, with the cross-phase period in between.

The pump 3 has maximum pilot pressure 80 psig, and maximum liquid pressure 60 psig. The maximum flow capacity for pump 3 is 6 LPM. Nominal operating parameters of this pump with cycle rate of 10-20 and 50% overlap produces a flow rate of about 3 LPM. It is possible to operate this pump with 20-30 psig of backpressure, and in fact this improves the pump 3 pressure fluctuation suppression which can be provided by a back pressure controller which in this embodiment is needle valve 9 and rotometer 8. This pump solves the pressure drop problem found in most diaphragm pumps when the chamber switches from suction to discharge. Instead of a pressure drop during switch-over, this pump employs cross-phase discharge. This causes the pressure to remain stable during the period when prior art pumps experience a pressure drop. There is no pressure fluctuation suppression device in this pump. Its design is thus robust against reliability concerns related to pulsation dampeners.

This pump solves the pressure drop problem found in most diaphragm pumps when the chamber switches from suction to discharge. Instead of a pressure drop during switch-over, this pump employs cross-phase discharge. This causes the pressure to remain stable during the period when prior art pumps experience a pressure drop. There is no pressure fluctuation suppression device in this pump. Its design is thus robust against reliability concerns related to pulsation dampeners.

The pump 3 is preferably situated as low as possible in the apparatus. It may be mounted on a saddle (not shown) which raises the pump off the floor to minimize vibration transfer to the rest of the apparatus. The pump is operated by gas. This low pressure fluctuation pump 3 constitutes the first stage of pressure fluctuation suppression.

The apparatus of this invention further comprises a pump controller 4 connected to and controlling the pump. The pump controller supplies gas, to the one or more diaphragms or bellows of the pump, from a source of gas. The pump controller also supplies negative pressure (vacuum) to the diaphragms or bellows of the pump. The pump controller may supply gas or vacuum to the diaphragms or bellows of the pump separately. In one embodiment, the pump controller may comprise a programmable logic relay, two solenoid valves, two venturi vacuum generators, two variable restrictor nuts restricting gas or vacuum flow to the pump diaphragms or bellows, a precision regulator, an exhaust muffler, and tubing and fittings to connect the parts of the controller. The programmable logic relay (PLR) is electrically connected to the solenoids. When operating, the PLR turns the solenoids on and off when instructed by an application program loaded in the PLR memory. The venturi vacuum generators supply negative pressure to the pump gas ports when the solenoids are turned off. The PLR and solenoid valves are electronic and require a source of power. The precision regulator controls gas backpressure in the pump. The solenoid valves supply gas to the variable restrictor nuts. The variable restrictor nuts each supply one diaphragm of the pump. The precision regulator, venturis, and solenoid valves of the pump controller all require a source of gas 5. One useful pump controller is available from Trebor.

The apparatus of this invention further comprises an optional filter(s) in one or more filter housings, shown as a single filter housing 6. FIG. 1 shows the filter housing on the discharge side of the pump. Alternative embodiments of the invention would alternatively or additionally place one or more filter housings on the suction side of the pump, or next to the inlet of the flow controller, or between the needle valve and the liquid supply container. The filter housing may be any size, for example, 10 to 20 inches or 10 or 20 inches in vertical length, and be made of polypropylene or PFA material. The housing may be right side up, with the bowl located below the inlet and outlet ports, or inverted, with the bowl above the inlet and outlet ports. The housing may also have the inlet port on the bottom of the bowl instead of on the side of the housing. The preferred embodiment is to locate the filter inlet as close to, meaning within 24 inches or within 12 inches of the pump discharge port, with inverted bowl and side inlet.

The apparatus of this invention further comprises a junction or tee 7 in the recirculation loop. The tee provides a path to recirculate liquid back to the liquid supply container as well as a path to supply the liquid flow controller. The recirculation path is useful to maintain a stable colloidal suspension, if the liquid is CMP slurry, in the apparatus and in the liquid supply container, to keep the CMP slurry or other liquid homogenized and sediment-free. The different lengths of suction 2 and return 10 insert tubes in the liquid supply container provide a means to collapse concentration or density gradients as recirculation turns the liquid supply container over. The recirculation loop further has a means to adjust backpressure in the recirculation loop such as a needle valve or pneumatic or electronic control valve or flow controller.

On one side downstream of the tee 7, the apparatus of this invention, as shown, further comprises a variable area flow meter 8 and needle valve 9 as a means to adjust the backpressure in the recirculation loop. The flow meter 8 provides visual indication of flow by the movement of the float behind the window, which is marked to indicate flow. Closing the manually operated needle valve 9 causes backpressure upstream of the valve to increase, and causes flow to decrease. In alternative embodiments of the invention, the flow meter 8 may be an electronic flow meter. In alternative embodiments, valve 9 may be an electronic or pneumatically powered control valve. In alternative embodiments, valve 9 may be a control valve that operates on feedback from a pressure transducer added to the recirculation loop upstream of the control valve.

On the other side downstream of the tee 7, the apparatus of this invention further comprises an optional isolation valve 11 that may be a pneumatic valve 11. This valve may be used to block the flow to the flow controller, to allow for the maintenance or replacement of the flow controller while the rest of the system remains operational.

Figure 2:
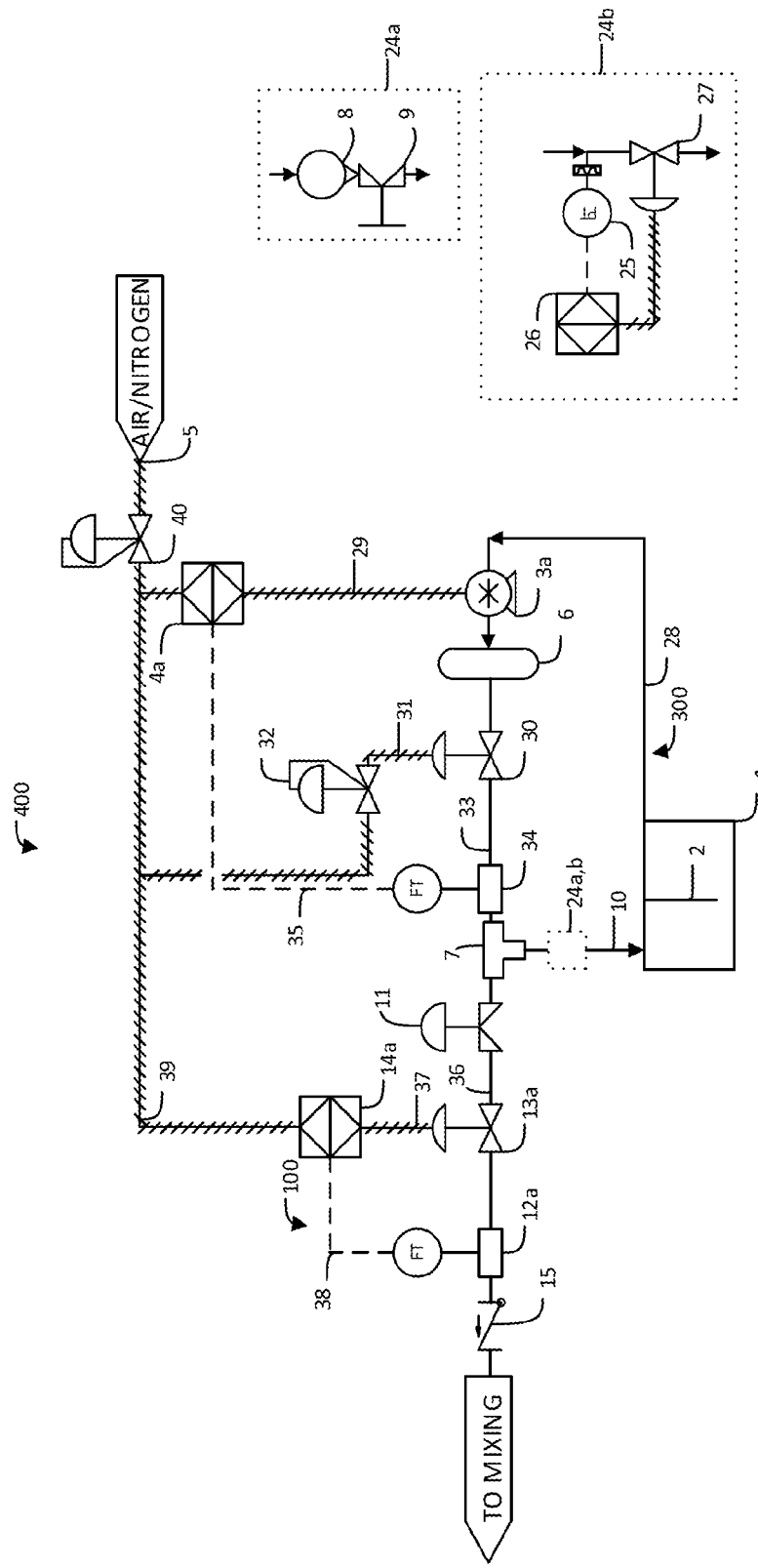
FIG. 2 is a second embodiment of an apparatus of this invention.
Figure 3:
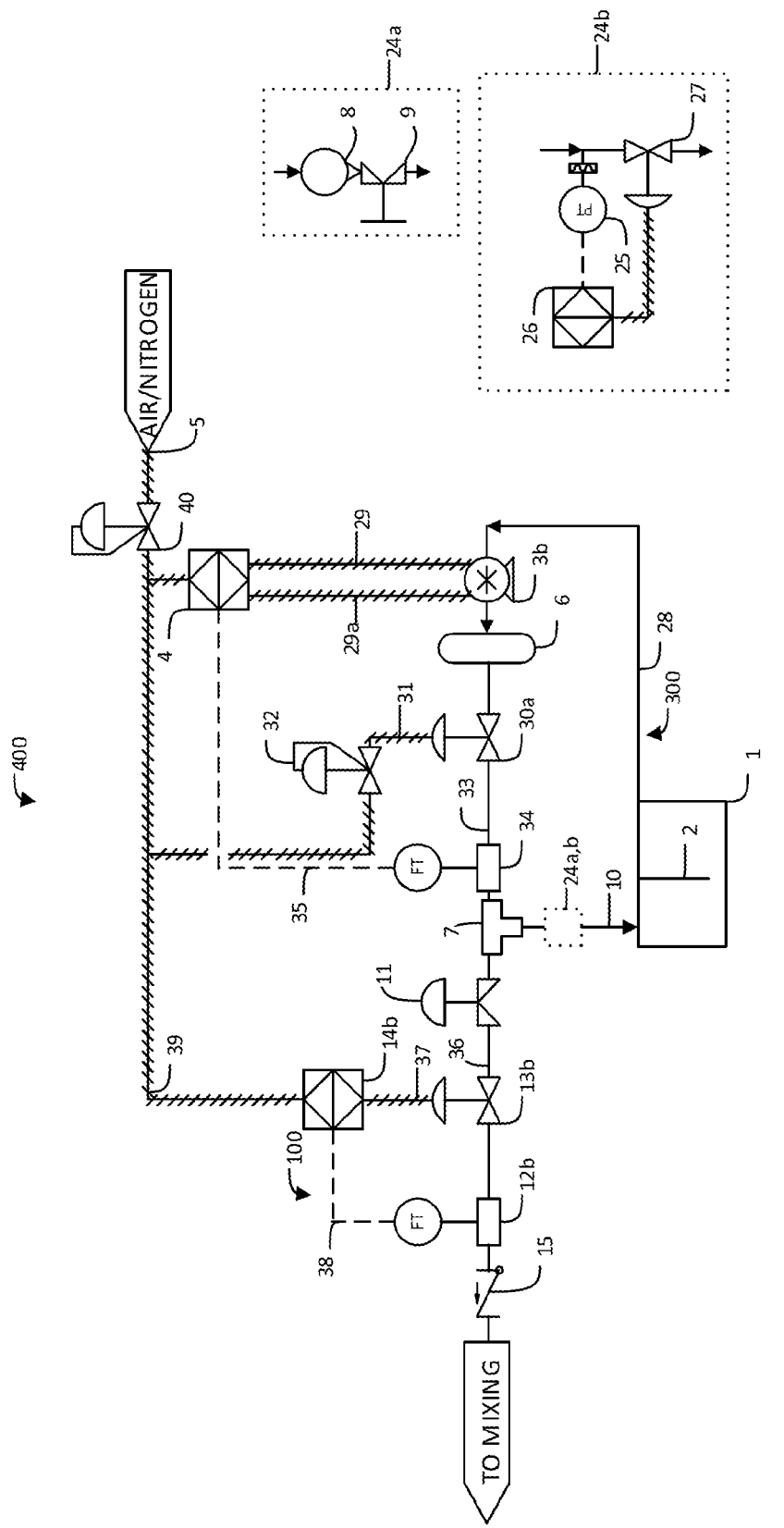
FIG. 3 is a third embodiment of an apparatus of this invention.

The apparatus of this invention further comprises a liquid flow controller 100. The flow controller 100 comprises a flow meter 12, a control valve 13 and a control device (a controller) 14. The flow controller 100 flow meter 12 may operate on an ultrasonic, rotating turbine or wheel, vortex, electromagnetic, coriolis, or differential pressure principle. The preferred flow meter operating principle is differential pressure, which provides the fastest response of any of the operating principles. The flow meter 12 is electronically connected to the control device 14 and fluid flows from the flow meter 12 to the control valve 13. The control valve 13 is normally closed. When instructed by the control device 14, the control valve 13 opens partially or fully, depending on the flow sensed by the flow meter 12. Flow controller units have different flow ranges. Flow controllers useful in this invention are made by Entegris. Useful controlled regulators 13 of the flow controller may have an upper and lower diaphragm joined by a shaft having a closure member, the shaft running through the valve orifice. The lower (inlet) diaphragm will move the closure member in response to pressure fluctuations. This controlled regulator 13, embedded in the Entegris 6510 flow controller, constitutes the second stage pressure fluctuation suppression. Because the controlled regulator 13, as shown, is downstream of flow meter 12 in FIG. 1, the pressure fluctuation suppression effect cannot be measured by the flow meter 12. In some flow controllers, the flow meter 12 and control valve 13 are embedded in a single body in the arrangement. It may be beneficial to use flow controllers in which the flow meter is downstream of the control valve or regulator as shown in the embodiments of FIGS. 2 and 3.

Flow controller 100 performance depends on the speed and accuracy of the flow meter 12, the speed and accuracy of the control algorithm of the control device 14, the speed and accuracy of the control valve 13, and the pressure and pressure fluctuation at the inlet to the flow meter 12. When the pressure fluctuation is low, the blending result is improved. The pressure fluctuation of the pump 3 is one factor that influences the pressure fluctuation in the apparatus, but not the only factor. Other factors include the orientation of the filter housing, if present, the presence of gas in the filter housing which may be in the top of the inverted filter housing, the amount of trapped gas in the filter housing, the pressure of the trapped gas, the ratio of trapped gas to liquid in the filter housing, the filter in the filter housing, the size of the filter housing, the compensation for pump pressure fluctuation provided by backpressure control device 9, and tube sizes, volume, and orientation. Other factors influencing flow controller accuracy are pressure and flow supplied to the flow meter 9.

The inventors have devised an apparatus, including a pump 3, filter housing 6, tubing, and backpressure control device 9 that provides low pressure fluctuation, adequate flow, and adequate pressure to the inlet of the flow meter of the flow controller 100. The apparatus requires only one pump. As has been mentioned previously, there are several vendors that make suitable types of each of these devices. The invention is not constrained to one vendor or device. Furthermore, vendors provide several sizes of each of these devices. For example, a pump of the invention may have ½" Flare ports, and supply 3 LPM of flow, or 1" Flare ports and 100 LPM of flow.

When pressure fluctuation in the apparatus is significant, the blending performance is degraded. The flow meter 12 rapidly detects this fluctuation. The control device 14 signals the control valve 13 to adjust in response to the fluctuation. This control valve, flow meter, and control device are fast responding devices, but do not respond instantly. The lag in response is problematic when pressure fluctuation is greater than +/−10%, or +/−5%, or +/−3%. The pressure fluctuation pulses from a prior art diaphragm pump are high-frequency. When the frequency of the fluctuation is greater than the sum of the lag times of the flow meter 12, control valve 13 and control device 14, which is termed "flow controller lag", the cycle of flow meter 12 detecting a change, and control device 14 signaling the control valve 13 to adjust, will occur too slowly to be effective. To be effective, the flow controller lag must be reduced or the pulse frequency decreased. The invention provides a way to reduce pulse frequency to ensure that the flow controller has sufficient time to respond.

The apparatus of this invention further comprises a liquid check valve 15. In the embodiment shown in FIG. 1, the check valve is connected to a tee 23 that is connected to another flow controller 200 supply line apparatus containing a second liquid component to be blended with the first liquid component to make a blended liquid, that may be a blended slurry. The second ingredient may be supplied by a pressurized source. If the pressure of the second ingredient is higher than the pressure of the first ingredient, there would be backflow, rather than mixing. The check valves 15,22 prevent backflow, thereby ensuring mixing occurs.

The apparatus of this invention further comprises a tee 23 connected downstream of both check valve 15, and check valve 22 and a mixing device 16 downstream of the tee 23. The tee, alone or in combination with optional one or more check valves, and/or optional one or more mixing devices, plus the tubing connecting these optional devices, create a mixing manifold. The mixing manifold described here is a simple one, mixing two ingredients and may just be a junction or tee. Alternatively, additional one and/or more check valve(s), mixer(s) and tee(s) could be added to it. Alternatively, a second manifold, with a one or more tees, one or more check valves, and one or more mixers in any combination, may be used to mix two more ingredients. Following the second mixing manifold may be a final mixer that combines the products of the first two manifolds into a final product. Two mixing manifolds plus a final mixer is an embodiment of the invention for mixing up to four ingredients. Another embodiment is a single mixing manifold that mixes three ingredients at once. Many different combinations are possible.

Mixing manifolds may be supplied with ingredients to mix via flow controllers. They could also be supplied by volumetric beakers, pressure vessels, or pumps. In other embodiments, mixing manifolds may be constructed to bring ingredients together without the use of a tee. Tee-less manifolds bring ingredients together by forming multiple passages in a single piece of material with multiple fluid ports, whereby the passages come together inside the manifold. The manifold may be a single plastic manifold. These integrated mixing manifolds may have check valves physically attached to the manifold.

Mixing manifolds or mixers may employ several mixing techniques. One common mixing technique is to create turbulence in the flow path via specially-designed inserts in the flow path. These inserts have been designed using computation fluid dynamics and practical tests so that they generate sufficient turbulence to aid the mixing of ingredients. Another mixing method is cyclonic mixing, which swirls two or more ingredients together in a bowl, passing each ingredient through a spiral bushing which imparts a twisting motion to the ingredients, aiding their mixing.

As shown, the apparatus of this invention further comprises a second ingredient reservoir 18. This reservoir may be pressurized to supply a bulk chemical distribution manifold, for distribution to points of use. The apparatus of the invention described would be one such point of use.

The apparatus of this invention, as shown, further comprises an optional second ingredient flow controller 200. The optional flow controller 200, as shown comprises of a flow meter 19, a control valve 20 and a control device 21. The flow meter 19 is connected to the control valve 20. The flow meter 19 is also electrically connected to the control device 21. The control valve 20 is connected electrically to the control device 21 also. The operation of flow controller 200 is analogous to the operation of flow controller 100, which has been described above. Port sizes, flow ranges, and pressure ranges may be the same or different with flow meters 12 and 19. Control valves 13 and 20 may have the same or different port sizes, maximum flow, internal orifice size, and other characteristics.

Variation in the pressure supplied to the flowmeter 19 inlet must be minimized in order for blending accuracy to be maximized. The pressure variation in pressure-distribution systems is usually much less than +/−10%, or +/−5%, or +/−3%, and preferably any variation that occurs is usually low-frequency, the type of variation the flow controller can easily control.

The apparatus of this invention further comprises a reservoir 17 for the blended product. Commonly, product is stored in a tank or other vessel prior to distribution to points of use or further filtration or other processing. An alternative embodiment of the invention would be a small reservoir, or no reservoir, providing direct distribution of the blended product to a point of use. It is also common to bypass the reservoir 17 and direct blended product to waste drain for a period of time to pack the lines in the blending manifolds and supply apparatus, removing aged product, and so the flow controllers have sufficient time to stabilize. Flow controllers typically stabilize after 3 seconds, meaning a line pack time of at least 3 seconds is optimal. After the line pack time has expired, the apparatus will fill the reservoir 17, or distribute blended slurry product to a point of use, or dispose of the blended slurry product some other way.

The process of the invention solves the problems mentioned in the background of the invention. These problems are related to physical quantities flow, pressure, and pressure fluctuation under different conditions (filtration, priming, and general operation). The objective is to provide sufficient flow, sufficient pressure, and minimal pressure fluctuation to the inlet of the flow controller's flow meter.

An additional embodiment of this invention is shown in FIG. 2. As shown in FIG. 2, chemical vessel 1 contains the liquid which will be delivered to the flow meter 12*a*. This liquid may be a high purity semiconductor-grade chemical, a CMP slurry, or any liquid. The suction line 28 connects the chemical vessel to the bellows pump 3*a*. The suction line may be preferably ½" outer diameter Entegris Fluoroline XKT tubing made of Daikin AP-231SH resin. Alternative tubing from Saint Gobain or Zeus or other resins such as Dupont 450HP or 950 are also suitable. Larger diameters may be used to improve suction line performance, such as ¾" or 1". Other tubes in the system are of the same Entegris Fluoroline XKT tubing unless otherwise noted.

In some alternative embodiments, suction line 28 may contain a strainer, manual isolation valves, or pneumatic air operated valves.

The pump 3*a* is a bellows pump having moderate pressure fluctuation. A One useful pump is available from Saint Gobain Asti. The moderate pressure fluctuation is of a kind produced by a bellows pump with air consumption of 6 SCFM or less, with maximum pump operating pressure 0.5 MPa or less. This produces a pressure fluctuation with relatively low frequency and amplitude. The pump is preferably situated as low as possible in the apparatus. It may be mounted on a saddle to minimize vibration transfer to the rest of the apparatus. The pump is operated by air or nitrogen, or other inert gas. The inert gas is supplied to the pilot port of the pump 3*a* via the air tube 29. The air tubing is preferably ⅛" outer diameter, or larger. Tubing 29 may be made out of FEP or other plastic. The air tube 29 supplying the pump may need to be a larger outer diameter if the line is longer than 3 meters. The pump 3*a* is supplied by controller 4*a* connected by tube 29. In some alternative embodiments, air tube 29 may contain a 2- or 3-way solenoid-actuated valve to turn air supply to the pump on and off.

Pump 3*a* is preferably operated at a pilot pressure of 0.35 MPa. The maximum pilot pressure is 0.5 MPa and the minimum is 0.2 MPa.

Controller 4*a* is preferably a Numatics Sentronic D or Sentronic Plus. This controller has an electrical connector for receiving setpoint, power, and external feedback signal, 35, from the flow meter 34. The controller receives a signal from flow meter 34. This signal becomes the basis for a cascade control scheme set in the controller 4*a* firmware. Cascade control means there are two loops, a slave and a master, with the master providing input to the slave loop. The master loop operates off the external feedback (flow meter 34). The slave loop operates off the outlet pressure transmitter which is internal to the controller 4*a* and measures the pressure in line 29. When there is a difference between the flow meter 34 setpoint and the flow meter feedback signal 35, this causes a change to the internal pressure setpoint within the controller 4a. The aggressiveness of the change depends on how the master firmware is tuned. This in turn causes the internal pressure transmitter to register an error signal in the pressure control loop. The pressure transmitter error results in the controller adjusting pressure supply to the pump 3a. The aggressiveness of the change depends on how the slave firmware is tuned. There are many parameters in the firmware which affect how the controller responds to signals, which can be adjusted by the engineer. The firmware is set so that the pressure range is 0.5-0.2 MPa. To summarize, controller 4a receives a signal from the flow meter and adjusts pressure supply to the pump 33a to maintain a flow rate setpoint.

The pump 3a is connected via a tube to an optional filter housing 6. The filter housing is the same as described in the first embodiment.

The filter housing 6 is connected via a tube to dome loaded pressure regulator 30. A useful regulator is available from SMC with a flow capacity of 40 LPM. (In other embodiments, the volumetric flow capacity of the regulator may be approximately 20 to 50 LPM). This compares with pump 3a maximum volumetric flow rate 2.5 GPM (9.5 LPM), a ratio of approximately 4:1. In other embodiments, this ratio may be from 2.5:1 to 5.5:1 or from 3:1 to 5:1 or 3.5:1 to 4.5:1. The maximum pressure (pilot and liquid) is 0.5 MPa, with 0.4 MPa (pilot and liquid) being practical nominal operating maximum pressures. The optimum pilot pressure range for maximum pressure fluctuation suppression is 0.15+/−0.05 MPa. The lower the pilot pressure, the better the pressure fluctuation (of the liquid) is suppressed. The pilot pressure controls the valve opening %; lower pressure causes the valve to open less. This reduces the flow rate. When the pump 3a is supplied with 0.35 MPa pilot pressure, and regulator 30 is supplied with 0.1 MPa pilot pressure, the flow rate in the system is about 3 LPM, and pressure fluctuation is so minor that the float of a rotameter is visibly steady. At 0.2 MPa regulator 30 pilot pressure, the rotameter float will bob slightly, indicating a small amount of pressure fluctuation. The larger regulator valve opening at 0.2 MPa causes the flow rate to increase. This regulator constitutes the first stage of pressure fluctuation suppression.

Dome loaded regulator 30 is a pressure reducing regulator. That means supplying regulator 30 with 0.1 MPa pilot pressure causes the outlet liquid pressure to be reduced to less than 0.1 MPa. The liquid supply pressure must be at least 0.2 MPa to obtain 0.1 MPa outlet pressure. Higher inlet pressure (0.35 MPa is the pump nominal operating pilot pressure) results in a greater pressure reduction, and greater effectiveness of pressure fluctuation suppression.

The dome loaded regulator 30 is provided with pressure via air tubing 31. This tube can be ¼" or 5/32" outer diameter, and made of any plastic material, although FEP is preferred. The tube leads to a direct-operated air regulator, 32. A common part used is available from SMC. There are many others that are commercially available.

Regulator 30 is connected to flow meter 34. The tube connecting them is chemical resistant PFA and can be any size large enough to handle the flow rate from regulator 30. A ½" tube size is preferred. A suitable flow meter part is from SMC. Flow meter 34 is in electrical communication with controller 4a shown by the dashed line 35. In some embodiments, the flow meter 34 is a variable area flow meter, such as those available from Futurestar.

The fluid next passes through a tee, 7. The first branch, 10, is the return tube to chemical vessel, 1. This provides a path for recirculation of the liquid not consumed by the flow control system 200.

The recirculation loop 300 comprises (optional chemical vessel 1), suction tube 2 (into the chemical vessel 1), pump 3a, regulator 30, flow meter 34, and return tube 10 and one or more backpressure units 24a and 24b located on the return tube 10 (into the chemical vessel 1). The regulator is located downstream of the pump and the flow meter is located downstream of the regulator. The regulator may be an electronically controlled regulator or a mechanically controlled regulator. This loop may be referred to as the pump flow control loop, since the flow meter 34, pump 3a and controller 4a combine to control pump flow.

In some alternative embodiments, return line 10 (which is located downstream of the junction 7) may have one or more of the following: a filter, manual isolation valves, pneumatic air operated valves, manual backpressure control system 24a having a variable area flow meter 8 and manual back pressure control valve 9, and/or backpressure control system 24b having a pressure transducer 25 electrically connected to a controller 26, which controls a pneumatic-actuated control valve 27.

Downstream of the junction 7 is the flow control system 100 having fluidly connected dome loaded regulator 13a, flow meter 12a and optional isolation valve 11 and also having a controller 14a in communication with the flow meter via the electrical connection 30 and controlling the regulator 13, since the object of this portion of the apparatus is to control flow through flow meter 12a. Regulator 13a is fluidly connected to tube 36, which is connected to the tee 7 and thereby to the recirculation loop 300, via optional isolation valve 11. In some embodiments, useful isolation valves may be pneumatic or manual isolation valve 11 fluidly connected between tee 7 and regulator 13a.

Tube 36 downstream of the isolation valve 11 feeds the regulator 13a and flow meter 12a. The tube size may preferably be ¼" outer diameter. Since the regulator 13a is controlled by the electronic controller 14a (which gets signal inputs from the flow meter 12a and controls a valve (not shown) within the controller 14a that controls the flow of the gas from gas supply 5 to the regulator 13a via line 39), it may be referred to as a controlled regulator. (This is in contrast to the regulator 30, that is supplied with air pressure from manual regulator 32 that uses a fixed manual adjustment method.) Further, since the controlled regulator 13a and 14a also has a controlled valve (also referred to as a control valve), and works in response to flow transmitter 12, those three components together may also be referred to as a flow controller.

The tube 36 is connected to dome loaded pressure regulator 13a. A useful regulator is available from SMC having a flow capacity of 4.5 LPM. The maximum pressure (pilot and liquid) is 0.5 MPa, with 0.4 MPa (pilot and liquid) being practical nominal operating maximum pressures. The optimum pilot pressure range for maximum pressure fluctuation suppression is 0.15+/−0.05 MPa. The lower the pilot pressure, the better the pressure fluctuation is suppressed. The pilot pressure controls the valve opening %; lower pressure causes the valve to open less. This reduces the flow rate. When the output from pressure regulator 30 is about 0.2 MPa pressure, and pressure regulator 13a is supplied with 0.1 MPa pilot pressure, the regulator will reduce the liquid pressure to less than 0.1 MPa, while suppressing pressure fluctuation. This regulator 13a constitutes the second stage of pressure fluctuation suppression. In this embodiment, the effect of the pressure fluctuation suppression will be measured by the flow meter 12a, downstream of the pressure regulator 13a.

The regulator 13a is connected to a controller, 14a, via air tube 37. Air tube 37 will be ¼" or 5/32" outer diameter and is preferred to be FEP, but can be any plastic. The controller 14a is a Sentronic D or Plus. The controller is operated in the same way as described for 44a, except the controller adjusts gas pressure to regulator 13a. The controller firmware is set to supply a gas pressure range of 0.15+/−0.05 MPa to regulator 13a. To summarize, controller 14a receives a signal from the flow meter 12 and adjusts gas pressure supply to regulator 13a to maintain a flow rate setpoint as measured by the flow meter 12a.

Regulator 13a is connected to flow meter 12a via a tube. Flow meter 12a is connected to controller 14a via electrical connection 39. Flow meter 12a may be a Levitronix Leviflow ultrasonic flow meter with flow range 0-4 LPM. Ultrasonic flow meters can measure flow rates accurately even when liquid pressure is less than 10 psig.

Controller 14a, regulator 30 and controller 4a are all supplied by regulator 40. Regulator 40 is a larger capacity regulator with maximum flow rate capacity 1500 LPM. A common part is from SMC. There are many similar parts that are commercially available. Regulator 40 is supplied by pressurized gas, typically air or nitrogen, supply 5.

Following the flow meter 12a, the fluid flows through a check valve 15, which prevents backflow, and then to a tool or into another part of the system which may be for blending as described above and as shown in FIG. 1. Multiple (more than one) low pressure fluctuation flow control apparatuses each comprising recirculation loops and flow control systems may be employed in the larger system in which multiple liquid components are consumed or blended, etc. Useful check valves include those from Entegris or Parker.

A third embodiment of the invention is shown in FIG. 3. The pump 3b of this embodiment is a low pressure fluctuation pump comprising dual diaphragms. This pump operates like the pump of embodiment 1. Suction and discharge strokes alternate with a cross-phase discharge phase occurring between suction and discharge. The pump reduces the pressure drop found in most other diaphragm or bellows pumps, and is free of an integral pulse dampener, which may be unreliable. The pump 3b has maximum pilot pressure 100 psig, and maximum liquid pressure 80 psig. The maximum flow capacity for pump 3b is 20 LPM. This is higher pressure and flow capacity than the pump of embodiment 1.

The dual chambers of pump 3b are supplied separately via the air tubes 29 and 29a. The air tubing is preferably ⅜" outer diameter, or larger. Tube 29 and 29a may be preferably be FEP but any plastic is suitable. The pump 3b is supplied by controller 4 connected by tube 29 and 29a. Pump 3b is preferably a Trebor Evolve 20 "X" model. This pump 3b constitutes the first stage pressure fluctuation suppression.

Controller 4 is preferably a Trebor PC15-02. This controller is the same as described in FIG. 1.

In FIG. 3, the controller 4 receives feedback signals from flow meter 34. The controller should include PID controller capability, and be programmed to change pump speed when there is a difference between the flow rate measured by the flow meter 34 and the setpoint supplied to the controller 4. Additionally, the controller should be programmed to change the overlap percent, so that the overlap decreases as the pump cycle rate increases.

The pump 3b is connected via a tube to an optional filter housing, 6 located downstream of the pump. The filter housing is the same as described in FIG. 1.

The optional filter housing 6 is connected via a tube to downstream dome loaded pressure regulator 30a. A useful regulator available from SMC has a flow capacity of 91 LPM. This compares with pump 3b maximum flow rate 20 LPM, a ratio of about 4.5:1. In this embodiment, the maximum pressure (pilot and liquid) is 0.5 MPa, with 0.4 MPa (pilot and liquid) being practical nominal operating maximum pressures. The optimum pilot pressure range for maximum pressure fluctuation suppression is 0.25+/−0.05 MPa. As previously described, lower pilot pressure produces lower pressure fluctuation, but also provides lower outlet pressure and lower flow rates. The regulator can operate at higher outlet pressure while suppressing pressure fluctuations effectively, in combination with a higher pressure supply from pump 3b. Optimally, the pump 3b should supply liquid exiting the pump at 60-70 psig to the regulator 30a. This regulator 30a constitutes the second stage pressure fluctuation suppression.

The dome loaded regulator 30a is provided with gas pressure via tubing 31. This tube can be ¼" or 5/32" outer diameter, and made of any plastic material, although FEP is preferred. The tube leads to a direct-operated air regulator, 32, available from SMC, for example.

Regulator 30a is connected to flow meter 34. The tube 33 connecting them is chemical resistant material and can be any size large enough to handle the flow rate from regulator 30a. A ½" tube size is preferred. A suitable flow meter part is a 1.8-20 LPM flow rate vortex flow meter made by SMC. Flow meter 34 is connected to controller 4 via electrical connector 35. In some embodiments, the flow meter 34 is a variable area flow meter, such as from Futurestar.

The fluid next passes through a tee, 7. The first branch, 10, is the return tube to chemical vessel, 1. This provides a path for recirculation of the liquid not consumed by the flow control system.

The recirculation loop 300 has optional chemical vessel 1, suction tube 2 that is placed into a chemical vessel 1 when it is present, pump 3b, regulator 30a and flow meter 34 upstream of the tee 7, and attached to the tee (and downstream of it) is return tube 10 and optionally backpressure unit 24a or 24b in the return tube 10 back to the chemical vessel 1. The recirculation loop 300 may also be referred to as the pump flow control loop 300, since the flow meter 34, pump 3b and controller 5 combine to control the flow of liquid from the pump. As shown the recirculation loop also has a filter 6. In alternative embodiments, additional components may be included in the recirculation loop.

For example, in some alternative embodiments, return line 10 may contain one or more of the following: a filter, manual isolation valves, pneumatic air operated valves, manual backpressure system 24a consisting of a variable area flow meter 8 and manual back pressure control valve 9, or backpressure control system 24b consisting of a pressure transducer 25 connected electrically to a controller 26, which controls a pneumatic-actuated control valve 27.

The combined dome loaded regulator 13b, flow meter 12b and controller 14b is termed the flow control system 100, since the object of this loop is to control flow through flow meter 12b. Regulator 13b is connected to tube 36, which is connected to the tee 7, via valve 11.

Additionally, in some alternative embodiments, there may be an optional pneumatic isolation valve 11 between tee 7 and regulator 13b or a manual isolation valve between tee 7 and regulator 13b, or both.

Tube 36 provides fluid to the regulator 13b and flow meter 12b. The tube size may preferably be ⅜" outer diameter. Tube 36 is connected to dome loaded pressure regulator 13b. A preferred regulator is from SMC with a flow capacity of 15 LPM. The maximum pressure (pilot and liquid) is 0.5 MPa, with 0.4 MPa (pilot and liquid) being practical nominal operating maximum pressures. The optimum pilot pressure range for maximum pressure fluctuation suppression is 0.15+/−0.05 MPa. Regulator 13b will obtain higher flow rates operating at 0.1-0.2 MPa pilot pressure than regulator 13a of the second embodiment shown in FIG. 2, while operating in an effective pilot pressure range for pressure fluctuation suppression. This regulator 13b constitutes the third stage of pressure fluctuation suppression. In this embodiment, the effect of the pressure fluctuation suppression will be measured by the flow meter 122b, downstream of the pressure regulator 13b.

The regulator is connected to controller, 14b, via air tube 37. Air tube 37 will be ¼" or 5/32" outer diameter and is preferred to be FEP, but can be any plastic. The controller 14b may be a Sentronic D or Plus. The controller is operated in the same way as described for 4a (FIG. 2), except the controller adjusts the gas pressure to regulator 13b. The controller firmware may be set to supply a pressure range of 0.15+/−0.05 MPa to regulator 13b. To summarize, controller 14b receives a signal from the flow meter 12b and adjusts pressure supply to regulator 13b to maintain a flow rate setpoint.

Regulator 13b is connected to flow meter 12b via the tube shown. Flow meter 12b is connected to controller 14b via electrical connection 38. Flow meter 12b may be a Levitronix Leviflow ultrasonic flow meter with 0-20 LPM flow range. Ultrasonic flow meters can measure flow rates accurately even when liquid pressure is less than 10 psig.

Controller 14b, regulator 30a and controller 4 are all supplied by regulator 40. Regulator 40 may be a larger capacity regulator with maximum flow rate capacity 1500 LPM, for example from SMC. Regulator 40 is supplied by air or nitrogen from a supply 5.

Following the flow meter 12b, the fluid flows through a check valve 15, which prevents backflow, and then into another part of the system for mixing or other use. The metered amount of liquid downstream of the check valve can be directed into a mixing portion of the apparatus, as shown in FIG. 1 to form a blended liquid. An Entegris or Parker check valve may be used. Multiple pump loops 300 and flow controller units 100 may be employed in the larger system for multiple liquid streams.

In use, the operator typically must attach a liquid supply container containing liquid and insert diptube 2. The pump starts operating, using suction to remove liquid from the container. The liquid recirculates from the container, through the pump, optional filter 6, in some embodiments regulator 30 or 30a, and in some embodiments backpressure units 24a and 24b, returning to the vessel.

When there is a need downstream and flow control of the liquid is desired, optional valve 11 opens and controlled regulator 13, 13a or 13b (depending on embodiment) opens to start the flow to the flow controller system. The valve in the regulator will adjust the proportion it is open by the controller 14, 14a or 14b (depending on embodiment) adjusting pilot pressure based on feedback from the flow meter 12, 12a or 12b (depending on embodiment). Regulator 30 and 30a reduce liquid pressure fluctuation. Pilot pressure is set in the controller 14a or 14b to be in the range disclosed by the invention to provide optimum pulsation dampening and flow control. Thus regulator 13, 13a and 13b provide a second or third stage pressure fluctuation suppression and flow control at the same time.

At the same time as 13, 13a or 13b opens, drawing off liquid from the recirculation loop 300, the flow meter 34 detects the flow rate change (which is reduced compared to setpoint flow rate) and signals the pump 3, 3a, or 3b (depending on embodiment) to adjust speed. The pump may adjust other variables depending upon signals, if any, from the controller.

This invention provides apparatuses and methods to supply a steady volume of liquid with low pressure fluctuation that can be used to form a liquid blend or to supply other equipment or tools. This invention has been described with reference to particular embodiments. It is understood and anticipated that modifications and substitutions can be made to the described embodiments, and that therefore, the invention is not limited to only the embodiments described.

The invention claimed is:

1. A low pressure fluctuation control apparatus comprising:
  a recirculation loop for recirculating a liquid said recirculation loop comprising, in fluid communication, a dip tube, a pump, a first regulator, a first flow meter, a junction and a return tube having a back pressure controller located in said return tube;
  a material supply line in fluid communication with said recirculation loop via and downstream of said junction, and a flow control system in said material supply line, wherein said recirculation loop draws said liquid from a supply container via said dip tube and returns at least a portion of said liquid to said supply container via said return tube downstream of said junction in said recirculation loop, wherein said pump is a diaphragm or bellows type pump;
  wherein said first regulator is controlled by a direct-operated air regulator;
  wherein said flow control system comprises a second flow controller; and
  wherein said second flow controller receives a signal from said second flow transmitter and adjusts a gas pressure to said direct-operated air regulator in response to said signal.

2. The apparatus of claim 1, wherein said second flow controller comprises a second flow meter and a second regulator in fluid communication, and wherein said second flow controller further comprises a control valve.

3. The apparatus of claim 2, wherein said first flow meter comprises a first flow transmitter and said second flow meter comprises a second flow transmitter.

4. The apparatus of claim 3, wherein said first flow transmitter is electrically connected to a first flow controller that receives a signal from said first flow transmitter and adjusts a pilot pressure to said pump.

5. The apparatus of claim 2, wherein one or more of said first and second regulators comprises two diaphragms.

6. The apparatus of claim 2, wherein said second flow meter is downstream of said control valve.

7. The apparatus of claim 1, wherein said flow control system further comprises an isolation valve.

8. The apparatus of claim 1, wherein said flow control system further comprises a check valve downstream of said second flow controller.

9. The apparatus of claim 1, wherein said back pressure controller comprises a back pressure control valve and a back pressure flow meter.

10. The apparatus of claim 1, wherein said recirculation loop further comprises a filter in said recirculation loop.

11. The apparatus of claim 1, wherein said first flow meter is downstream of said first regulator and provides backpressure to said first regulator.

12. The apparatus of claim 1, wherein said pump is a cross-phase pump.

13. The apparatus of claim 1, wherein said first regulator is sized such that the ratio of a maximum volumetric flow rate of said first regulator to a maximum volumetric flow rate of said pump is between 2.5:1 and 5.5:1.

14. A low pressure fluctuation control apparatus comprising:
a recirculation loop for recirculating a liquid said recirculation loop comprising, in fluid communication, a dip tube, a pump, a first regulator, a first flow meter, a junction and a return tube having a back pressure controller located in said return tube;
a material supply line in fluid communication with said recirculation loop via and downstream of said junction, and a flow control system in said material supply line, wherein said recirculation loop draws said liquid from a supply container via said dip tube and returns at least a portion of said liquid to said supply container via said return tube downstream of said junction in said recirculation loop, wherein said pump is a diaphragm or bellows type pump;
wherein said flow control system comprises a second flow controller;
wherein said second flow controller comprises a second flow meter and a second regulator in fluid communication, and wherein said second flow controller further comprises a control valve; and
wherein one or more of said first and second regulators comprises two diaphragms.

15. The apparatus of claim 14, wherein said first flow meter comprises a first flow transmitter and said second flow meter comprises a second flow transmitter.

16. The apparatus of claim 15, wherein said first flow transmitter is electrically connected to a first flow controller that receives a signal from said first flow transmitter and adjusts a pilot pressure to said pump.

17. The apparatus of claim 14, wherein said first regulator is controlled by a direct-operated air regulator.

18. The apparatus of claim 14, wherein said flow control system further comprises an isolation valve.

19. The apparatus of claim 14, wherein said flow control system further comprises a check valve downstream of said second flow controller.

20. The apparatus of claim 14, wherein said second flow controller receives a signal from a second flow transmitter and adjusts a gas pressure to a direct-operated air regulator in response to said signal.

21. The apparatus of claim 14, wherein said back pressure controller comprises a back pressure control valve and a back pressure flow meter.

22. The apparatus of claim 14, wherein said recirculation loop further comprises a filter in said recirculation loop.

23. The apparatus of claim 14, wherein said first flow meter is downstream of said first regulator and provides backpressure to said first regulator.

24. The apparatus of claim 14, wherein said pump is a cross-phase pump.

25. The apparatus of claim 14, wherein said first regulator is sized such that the ratio of a maximum volumetric flow rate of said first regulator to a maximum volumetric flow rate of said pump is between 2.5:1 and 5.5:1.

26. The apparatus of claim 14, wherein said second flow meter is downstream of said control valve.

27. A low pressure fluctuation control apparatus comprising:
a recirculation loop for recirculating a liquid said recirculation loop comprising, in fluid communication, a dip tube, a pump, a first regulator, a first flow meter, a junction and a return tube having a back pressure controller located in said return tube;
a material supply line in fluid communication with said recirculation loop via and downstream of said junction, and a flow control system in said material supply line, wherein said recirculation loop draws said liquid from a supply container via said dip tube and returns at least a portion of said liquid to said supply container via said return tube downstream of said junction in said recirculation loop, wherein said pump is a diaphragm or bellows type pump; and
wherein said pump is a cross-phase pump.

28. The apparatus of claim 27, wherein said flow control system comprises a second flow controller.

29. The apparatus of claim 28, wherein said second flow controller comprises a second flow meter and a second regulator in fluid communication, and wherein said second flow controller further comprises a control valve.

30. The apparatus of claim 29, wherein said first flow meter comprises a first flow transmitter and said second flow meter comprises a second flow transmitter.

31. The apparatus of claim 30, wherein said first flow transmitter is electrically connected to a first flow controller that receives a signal from said first flow transmitter and adjusts a pilot pressure to said pump.

32. The apparatus of claim 29, wherein one or more of said first and second regulators comprises two diaphragms.

33. The apparatus of claim 29, wherein said second flow meter is downstream of said control valve.

34. The apparatus of claim 28, wherein said flow control system further comprises an isolation valve.

35. The apparatus of claim 28, wherein said flow control system further comprises a check valve downstream of said second flow controller.

36. The apparatus of claim 14, wherein said first regulator is controlled by a direct-operated air regulator.

37. The apparatus of claim 36, further comprising a second flow controller that receives a signal from a second flow transmitter and adjusts a gas pressure to said direct-operated air regulator in response to said signal.

38. The apparatus of claim 27, wherein said back pressure controller comprises a back pressure control valve and a back pressure flow meter.

39. The apparatus of claim 27, wherein said recirculation loop further comprises a filter in said recirculation loop.

40. The apparatus of claim 27, wherein said first flow meter is downstream of said first regulator and provides backpressure to said first regulator.

41. The apparatus of claim 27, wherein said first regulator is sized such that the ratio of a maximum volumetric flow rate of said first regulator to a maximum volumetric flow rate of said pump is between 2.5:1 and 5.5:1.

* * * * *